April 26, 1932. O. MOHR 1,855,982
PURIFICATION OF WASTE AQUEOUS LIQUOR
Filed Oct. 26, 1929 2 Sheets-Sheet 1
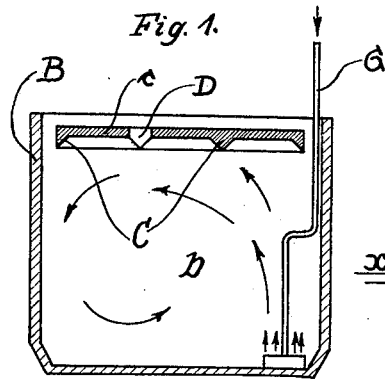
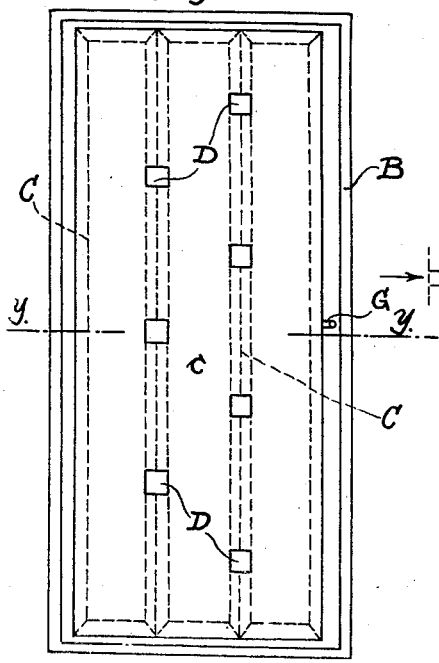
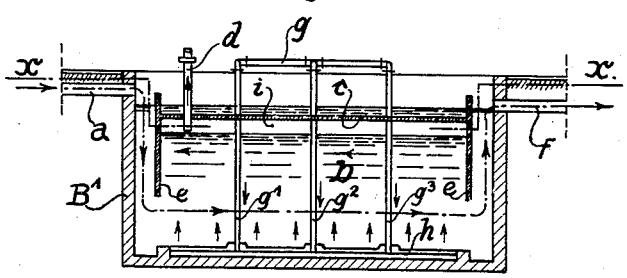
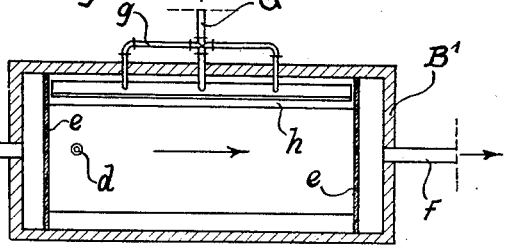
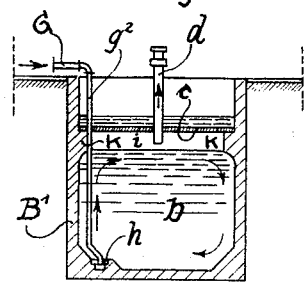
Inventor:
Otto Mohr

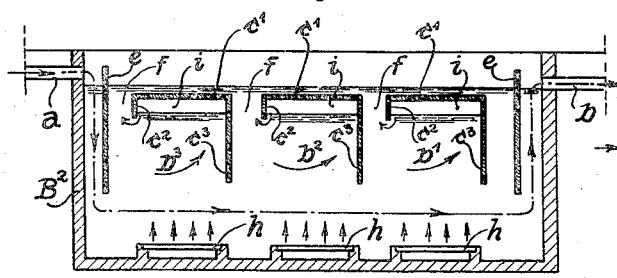
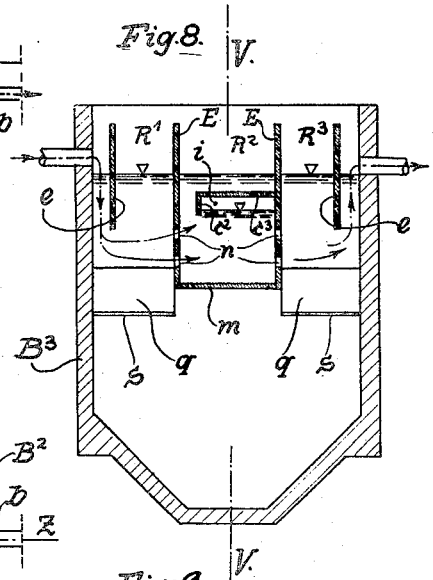
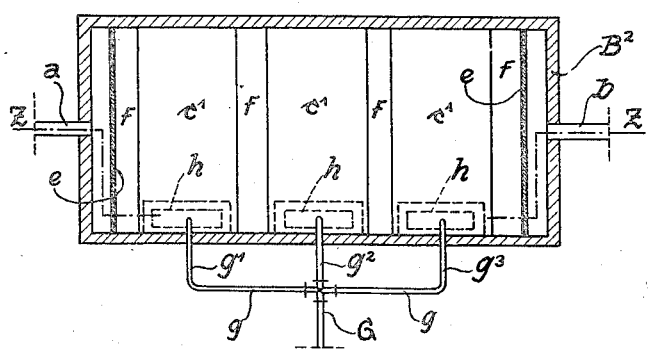
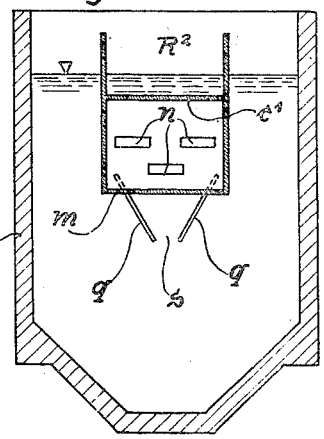
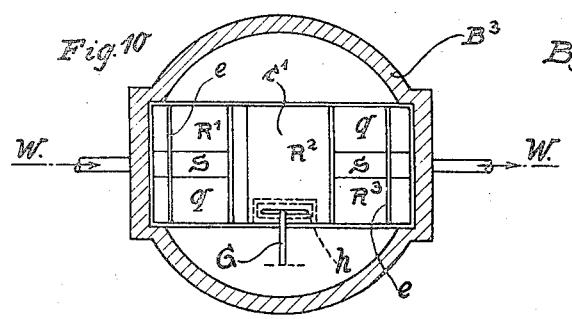

Patented Apr. 26, 1932

1,855,982

UNITED STATES PATENT OFFICE

OTTO MOHR, OF WIESBADEN, GERMANY

PURIFICATION OF WASTE AQUEOUS LIQUOR

Application filed October 26, 1929, Serial No. 402,715, and in Germany September 12, 1928.

There are known waste water purification plants, in which the biological purification of waste water by blowing in compressed air takes place. In this manner of operation the air escapes either solely from the first vessel into which it is passed, directly into the atmospheric air, or is purified and further employed in other vessels. The method employing the air solely in one vessel has the disadvantage that it is too expensive and therefore impracticable. The second method of repeatedly using the air in a plurality of vessels has, however, certain advantages, but these are counterbalanced in that a considerably higher power is then necessary in order to force the quantity of air through a plurality of water columns in one working operation.

The present invention also relates to aeration in such biological plants, and attains a more efficient use of the air than hitherto, so that the quantity thereof necessary may be considerably reduced. The method consists in arranging in the aerating vessel under natural or artificial pressure, a porous or an air permeable cover, and the air being led in under this cover. This cover may equally well be arranged beneath the water surface, at the water surface, or finally above the water surface. By the injection of the compressed air into the waste water the air is retained under the cover and is thereby maintained longer in the vessel, and can thus energetically react on the waste water. In this way, so much of the air may be retained that it forms an air cushion under the cover, which, according to the degasifying arrangement provided, has a greater or lesser excess pressure above atmospheric. The pressure may, if desired, also be set up artificially by mechanical means. The air in the air cushion beneath the cover of the settling containers is under a pressure equal to the atmospheric pressure plus the hydrostatic pressure, that is the excess water pressure indicated by the difference in level of the water surface of the aeration chamber, and of the water level of the whole plant. As a result of this excess pressure the waste water dissolves a correspondingly greater quantity of air without a practically greater force being necessary.

The cover in the aeration chamber can be, as already remarked, porous or air permeable, so that in this way a control of the size of the air cushion results, or on the other hand the cover itself may be gas-tight and special forms of degasifiers provided in the same. Such a degasifier consists, preferably, in an adjustable tube or the like in the upper part of the cover which leads from the cover and reaches above the water surface of the whole apparatus. Accordingly, in proportion as the tube plunges more or less deeply, a more or less large air cushion of determined pressure is formed under the cover. In any case, the excess of air can readily escape by way of this tube. Econimically the value of the invention may be increased by employing either a determined small quantity of air, whereby the operation expenses are reduced, or by dimensioning the vessels as small as possible with regard to the strengthened air absorption, whereby the plant costs are reduced.

According to the local conditions, also, by the combination of both considerations, a reduction of plant costs and a reduction of operation costs and an increase in the efficiency can be obtained.

Further in consequence of the increased absorption of air due to the excess pressure and the air cushion, a decrease in the number of filter base plates can be made which has the consequence of a greater reliability of operation in view of these plates becoming blocked in use. If desired even these filter plates can be dispensed with, and the air introduced at the lower part of the aeration vessels or at a higher point if desired directly underneath the cover. It is then advisable to maintain the aeration chamber in agitation by means of known agitating devices, in order to increase the absorption of air.

For the purpose of enhancing the vitality of the micro-organisms it would be advantageous to heat the water in the aeration vessel. This heating can be effected by means of hot water in pipes or in any other known manner. It is also possible to effect the heating of the waste water by heating the air introduced, prior to its introduction.

The value of the new process resides in that for complete or partial biological purification the consumption of air is less than is ordinarily the case, the period of circulation is shortened and an increased efficiency can be obtained with comparatively small constructional surfaces and the smallest possible cost of operation and maintenance while the mud separating out assumes a reduced and more satisfactory consistency.

It is of special advantage that the quantity of air used in the present process is expended as far as possible, and this makes it possible, more particularly with the additional use of agitators, to reduce the quantity of air to an extreme minimum and in certain circumstances to reduce it to such an extent that only sufficient air is supplied to the system which is necessary for maintaining the biological process.

It has also been found to be advisable so to arrange the air outlet that the flow of air to the outlet tube is opposed to the direction of flow of the waste water through the vessel. In this manner the surface of the water is continuously broken up, in an analogous manner to that in which a strong wind blowing in the opposite direction to the direction of a stream operates, and is consequently adapted to absorb an increased quantity of air. The consequence of this is that the air is more completely expended.

The devices serving for carrying out the new process of aeration for complete or partial biological purification can be constructed as depositing chambers either upon or below the surface of the water in two storied systems. For this purpose the usual connecting apertures between the chambers in the settling vessels and the circulating and rotting chambers can be permanently or periodically closed.

The new process will first be further explained with reference to the devices shown by way of example in the drawings. Figure 1 shows a cross section on the lines Y—Y of Figure 2 which is a plan view of a particularly simple form of a waste water clarification plant with open vessels and aeration. Figures 3 to 5 show a clarification plant with flowing waste water and a cover fixed in front of the supply and discharge pipes between the exchange walls. Figure 3 is a section along the line X—X of Figure 4 and Figure 4 is a central section of Figure 3. Figure 5 is a cross section. Figures 6 and 7 represent a clarification plant with particularly long waste water vessels. Figure 6 is a section along the line Z—Z of Figure 7 which is a plan view. Figures 8 to 10 show a plant for the complete biological clarification with preliminary and subsequent clarification and aeration chamber between the two chambers provided therefor. Figure 8 is a longitudinal section along the line W—W of Figure 10, Figure 9 is a cross section along the line V—V of Figure 8 and Figure 10 is a plan view of the plant.

According to the constructional form of Figures 1 and 2 a cover $c$ floats on the surface of the water in the vessel B receiving the waste water. Compressed air is introduced into the water through a pipe G, whereby the water in the space $b$ is circulated and the compressed air is stored under the cover but finally escapes around the edges of the cover $c$ into the atmosphere. It can, however, also escape through apertures D in the cover. In order to increase the stay in the vessel the cover may be provided with ribs C on the under surface.

According to the construction of Figures 3 to 5 the waste water comes to the supply pipe $a$ into the clarification vessel B' and leaves the same travelling in the direction of the arrow to the discharge pipe $f$. Externally of the longitudinal wall of the vessel is provided a supply pipe G for the compressed air having a horizontal branch $g$ from which a number of vertical arms $g'$, $g^2$, $g^3$ lead to the interior of the vessel B. The arms discharge under filter base plates $h$ and thus lead the air into the chamber $b$ filled with water whereby this is aerated and set in circulation. Immersed walls $e$ project into the space $b$ and are connected with each other above the surface of the water by means of the cover $c$. The walls $e$ close the aeration chamber against the feed and discharge pipes $a$ $f$ and the cover $c$ resting on the supports $k$ of the vessel captures the air passing through the waste water so that a cushion of compressed air is formed thereunder. A tube $d$ displaceable in the vertical direction projects through the cover $c$ and compressed air in excess can escape through this tube. This tube has however still another important function.

Particularly in the case of small inflow as by night when it is only half as great as the inflow by day, the height of the air cushion must be correspondingly increased. If, for example, the vessel is only half full of water then the space above the water must be filled with air to a depth double that by day. If, however, this larger quantity of air is also only slightly subjected to pressure only a little compressed air needs to be introduced in order that the speed of circulation remains the same. If the air pressure is maintained at night the same as by day, the absorption of air and the speed of circulation are considerably increased, which is of great advantage.

It is advantageous to introduce the tube $d$ which removes excess air from the cushion $i$ laterally into the vessel in order that the air stream to be led out is directed as far as possible in the opposite direction to the flow of waste water and thus occasions a considerable breaking up of the surface of the water and consequently a powerful aeration.

Although, in consequence of the air cushion, the waste water vessels can be smaller than is customary the waste water conditions may require the provision of comparatively larger, i. e. longer vessels. In such cases, the provision of a single cover above the aeration chamber is rendered difficult and is also scarcely practicable. In consequence, according to the invention, for such cases the cover is sub-divided with intermediate chambers. In this manner the aeration and removal of the air from the waste water is considerably more uniform.

A waste water clarification system with a sub-divided cover provided over the aeration chamber is represented in Figures 6 and 7. The cover of the vessel $B^2$ is divided into three parts $C'$, which have a gap $f$ between them and project with vertical walls $c^2$, $c^3$ into the waste water so that three aeration chambers $b^1$, $b^2$ and $b^3$ result. The walls $c^3$ on the discharge side are longer than those $c^2$ on the inlet side. In the chambers $b^1$, $b^2$, $b^3$ thus formed, the rising air is caught under the part covers $c'$, collects until it reaches the lower edge of the shorter walls $c^2$ and escapes under these into the spaces $f$ and from thence into the open. By this guiding of the air stream the speed of the air above the surface of the waste water is not intolerably large and is in any case comparatively uniform. In addition the supply of air to the aeration chambers in the spaces $f$ can be more readily controlled and above all it is ensured that the outflowing air flows in the opposite direction to the water.

Further, in this, as in the previously described construction, the discharge of air can take place between the wall of the vessel and the immersion wall, so that the emerging air arrives at the water supply or in its immediate vicinity, and a particularly intimate mixture of the compressed air with the waste water occurs.

In the part biological purification for which two storied constructions can be used the system shown in Figures 8 to 10 is employed. The vessel $B^3$ is subdivided into three chambers. The chamber $R'$ is a settling chamber serving for the preliminary clarification. Chamber $R^2$ is the culture chamber and $R^3$ the settling chamber for subsequent clarification. The settling chambers are provided in known manner with a funnel shaped base $q$ with an aperture $s$; the culture chamber is completely closed from the rotting chamber arranged beneath it by means of the base $m$ so that no mud is deposited here. The bottom carries the base $h$ through which air introduced through the tubes $G$ into the aeration chamber $R^2$ passes under the cover $C'$, $C^2$ and here forms a cushion $i$. The lateral wall $E$ of the aeration chamber has apertures $n$ for the passage of waste water from the chamber $R'$ and to the chamber $R^3$. The mud passes from both these chambers through the apertures $s$ into the bottom $q$. By this biological purification the waste water can be purified as far as desired without mechanically movable constructional parts having to be used and without detrimental counter currents occurring between the individual chambers.

I claim:—

Apparatus for the biological purification of waste water, comprising a container provided with an inlet and outlet for waste water and an inlet and outlet for air, and a multi-part cover, each part of said cover being provided with downwardly extended walls immersed in said waste water, the wall of each portion of said cover nearer the outlet for said waste water being deeper than the wall nearer the inlet, so that air is caused to escape under the shallow walls in counter current to the flow of water.

OTTO MOHR.